UNITED STATES PATENT OFFICE.

NEWTON A. WILSON, OF DETROIT, MICHIGAN, ASSIGNOR OF ONE-HALF TO CHARLES H. PETTON, OF DETROIT, MICHIGAN.

VEHICLE SPRING.

1,410,439. Specification of Letters Patent. Patented Mar. 21, 1922.

Application filed June 14, 1920. Serial No. 388,819.

*To all whom it may concern:*

Be it known that I, NEWTON A. WILSON, a citizen of the United States of America, residing at Detroit, in the county of Wayne and State of Michigan, have invented certain new and useful Improvements in Vehicle Springs, of which the following is a specification, reference being had therein to the accompanying drawings.

This invention relates to vehicle springs, particularly to that type generally known as leaf springs wherein bowed springs varying in length are placed in superposed relation to provide a laminated structure which may be considered semi-elliptic or quarter elliptic, such springs being interposed between the chassis and the body of an automobile or similar vehicle.

One disadvantage incident to the use of leaf springs on vehicles is that the leaves of the springs are quite liable to become dry in use and squeak. In order to prevent this squeaking it is common practice to lubricate the leaves of the spring, but it is difficult to inject the lubricant between the leaves without spreading them apart by either a wedging tool or jacking up the vehicle, and even then, the lubricant is soon pressed out from between the leaves of the spring. I am aware that the confronting faces of such spring leaves have been provided with grooves to prevent the escape and waste of the lubricant, but even with such grooves it is impossible to equally distribute the lubricant throughout the spring structure so as to avoid friction between the leaves of the spring.

The primary object of my invention is to furnish the leaves of the spring with channels, a lubricant main well common to all of the spring leaves and auxiliary wells for each spring leaf, and to provide means for forcibly injecting oil into all the channels and wells so that the spring structure will be thoroughly oiled throughout.

A further object of my invention is to accomplish the above result by a mechanical construction that does not add any material expense to the manufacture of the spring, but which renders a spring practically noiseless and highly efficient as suspension means for a vehicle body relative to its chassis or running gear.

My invention will be hereinafter more fully considered and then claimed, and reference will now be had to the drawings, wherein—

Figure 1:
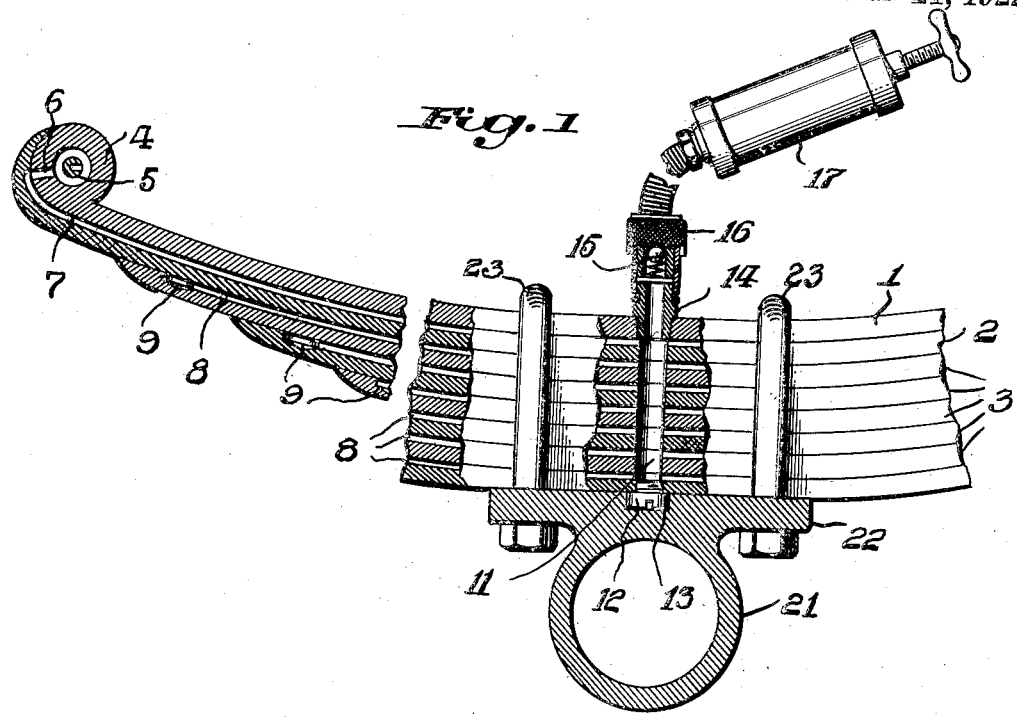
Figure 1 is a side elevation of a portion of a spring, partly broken away and partly in section, showing a grease gun or lubricant injector connected to the spring for loading the same with a lubricant.

In the drawing, the reference numeral 21 denotes an axle or suitable support having a spring perch 22 provided with clevises 23 or other holding devices for retaining a leaf or laminated spring on the perch 22 so that an end of the spring may support a vehicle body or other structure relative to the axle or support 21.

The spring comprises main leaves 1 and 2 approximately the same length and other leaves 3 which vary in length, all of the leaves being held in superposed relation by the clevises 3.

The main leaf 1 has its ends terminating in eyes or barrels 4 to receive the grooved and ported bolts or pins 5 of shackles or other connecting means for articulating the ends of the spring relative to a vehicle body. As the shackles or connecting means form no part of this invention, it is thought unnecessary to illustrate the same other than to indicate that such shackles or connecting means are to be lubricated. For this purpose the eyes or barrels 4 are provided with ports 6 communicating with the ends of a longitudinal channel 7 in the upper face of the main leaf 2, and by reference to Fig. 1 it will be observed that the ends of this main leaf 2 are bent upwardly onto or about the eye or barrel 4 of the main leaf 1. This constructive arrangement permits of the port 6 in the eye or barrel 4 being located above the bottom of the eye or barrel so that the interior of the eye or barrel will serve as a well and retain lubricant therein. It will be impossible for the lubricant, which is forcibly injected into the eye or barrel to drain back into the channel 7 of the main leaf 2, consequently the ends of the spring cannot become immediately dry after being supplied with lubricant.

The other spring leaves 3 have the upper faces thereof provided with longitudinal central channels 8 and the ends of each channel terminates in small wells 9 which will retain small quantities of lubricant therein and as the leaves of the spring are flexed during the operation of a vehicle the lubricant within the wells 9 will flow into the channels 8 and back and forth therein, so that the lubricant may find its way between the confronting faces of the spring leaves and thoroughly oil the same.

Figure 2:
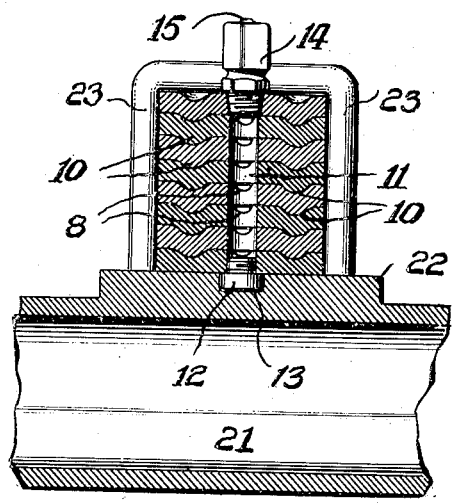
Fig. 2 is a cross sectional view of the spring.
Figure 3:
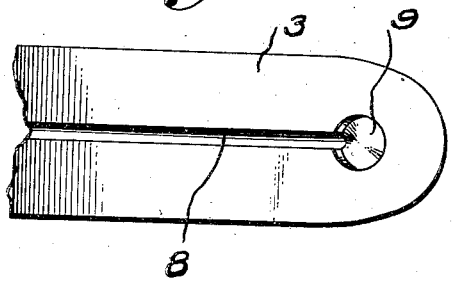
Fig. 3 is a plan of a portion of one of the leaves thereof.

To assist in correctly positioning the spring leaves, all of the leaves are formed with depressed portions or teats 10 contiguous to the side edges thereof, these depressed portions interlocking or fitting one within the other, as best shown in Fig. 2.

Intermediate the ends of the spring leaves 1, 2 and 3 there are registering apertures providing a lubricant well 11 which is common to all of the spring leaves and communicates with the channels 7 and 8 thereof. The bottom of the main well 11 is closed by a detachable plug or screw 12 and the perch 22 is recessed as at 13, to provide clearance for the plug or screw, as best shown in Fig. 2. In the aperture of the uppermost or main spring 1 is mounted a filling connection 14 containing a conventional form of check valve 15 which is normally closed and adapted to be automatically opened when lubricant is injected into the spring structure and a coupling 16 attached to the filling connection. The coupling 16 forms part of a conventional form of grease gun or lubricant injector 17 and when this gun or injector is operated lubricant is forced into the main well 11, the channels 7 and 8, the well 9, and the eyes or barrels 4 at the ends of the spring structure. With the spring fully charged with lubricant the same will last for some time, and it is practically impossible for dust or other foreign matter to interfere with the circulation of lubricant in the spring structure.

It is thought that the utility of my invention will be apparent without further description, and while in the drawing there is illustrated a preferred embodiment of my invention, it is to be understood that the structural elements are susceptible to such modifications and variations as fall within the scope of the appended claim.

What I claim is:—

In a vehicle spring of the laminated type wherein a plurality of leaves are held together on a spring perch by clevises, and the uppermost spring leaf has end eyes:— means to facilitate lubricating the leaves and eyes, consisting in providing some of the leaves with channels, and providing the uppermost channeled leaf with ends hooked against the eyes of the eye leaf; providing the eyes with ports above the bottoms of the eyes in communication with the channel of the leaf adjacent the eye leaf so that lubricant entering the eyes cannot drain back into the channel of the leaf; providing said channeled leaves with wells communicating with the channels thereof, and mounting a coupling in the well of the eye leaf between the clevises so that a grease gun may be attached for forcing lubricant into the walls and channels of the spring.

In testimony whereof I affix my signature in the presence of two witnesses.

NEWTON A. WILSON.

Witnesses:
O. F. BARTHEL,
K. H. BUTLER.